United States Patent
Lindquist et al.

(10) Patent No.: US 11,571,944 B2
(45) Date of Patent: Feb. 7, 2023

(54) ELECTRIC VEHICLE THERMAL SYSTEM WITH WASTE HEAT RECOVERY

(71) Applicants: Craig A Lindquist, Shelby Township, MI (US); Changchun Li, Rochester Hills, MI (US); Attilio Crivellari, Volvera (IT)

(72) Inventors: Craig A Lindquist, Shelby Township, MI (US); Changchun Li, Rochester Hills, MI (US); Attilio Crivellari, Volvera (IT)

(73) Assignee: FCA US LLC, Auburn Hills, MI (US)

( * ) Notice: Subject to any disclaimer, the term of this patent is extended or adjusted under 35 U.S.C. 154(b) by 99 days.

(21) Appl. No.: 17/102,718

(22) Filed: Nov. 24, 2020

(65) Prior Publication Data

US 2022/0161630 A1 May 26, 2022

(51) Int. Cl.
| | | |
|---|---|---|
| B60H 1/32 | (2006.01) | |
| B60H 1/00 | (2006.01) | |
| B60L 58/26 | (2019.01) | |
| B60K 11/02 | (2006.01) | |
| B60K 1/00 | (2006.01) | |

(52) U.S. Cl.
CPC .......... *B60H 1/00278* (2013.01); *B60K 11/02* (2013.01); *B60L 58/26* (2019.02); *B60H 2001/00307* (2013.01); *B60K 2001/005* (2013.01); *B60K 2001/006* (2013.01)

(58) Field of Classification Search
CPC ...... B60H 1/00278; B60H 2001/00307; B60L 58/26; B60K 11/02; B60K 2001/005; B60K 2001/006

USPC .......................................................... 62/239
See application file for complete search history.

(56) References Cited

U.S. PATENT DOCUMENTS

| | | |
|---|---|---|
| 5,507,153 A | 4/1996 | Seto et al. |
| 6,616,059 B2 | 9/2003 | Sabhapathy et al. |
| 8,191,618 B2 | 6/2012 | Gering et al. |
| 8,336,319 B2 | 12/2012 | Johnston et al. |
| 8,833,496 B2 | 9/2014 | Sujan et al. |
| 8,851,153 B2 | 10/2014 | Park et al. |
| 9,260,103 B2 | 2/2016 | Porras et al. |
| 9,428,032 B2 | 8/2016 | Zhang et al. |
| 9,561,704 B2 | 2/2017 | Enomoto et al. |
| 2005/0000473 A1* | 1/2005 | Ap .......................... F01P 7/165 123/41.31 |
| 2012/0159978 A1* | 6/2012 | Shih ................... B60H 1/00278 62/180 |
| 2014/0109872 A1 | 4/2014 | Porras et al. |
| 2014/0216709 A1 | 8/2014 | Smith et al. |
| 2015/0330351 A1 | 11/2015 | Ragazzi et al. |
| 2015/0360539 A1 | 12/2015 | Park et al. |

* cited by examiner

*Primary Examiner* — Davis D Hwu
(74) *Attorney, Agent, or Firm* — Ralph E. Smith

(57) ABSTRACT

A thermal system for a vehicle includes a high temperature coolant loop thermally coupled to a heater core, a low temperature coolant loop thermally coupled to at least one of an electric motor and power electronics, and a first four-way valve configured to selectively fluidly couple the high temperature coolant loop and the low temperature coolant loop such that coolant heated by the electric motor and/or the power electronics is directed to the heater core to facilitate heating of an airflow passing thereby.

14 Claims, 2 Drawing Sheets

| Condition | MODE 1<br>Normal Operation | MODE 2<br>Low Heat Needed in Cabin | MODE 3<br>High Heat Needed in Cabin | MODE 4<br>Cold Start | MODE 5<br>Heat Battery | MODE 6<br>Cool Battery |
|---|---|---|---|---|---|---|
| Heating Need | | Heater Core 38 | Heater Core 38 | Heater Core 38 | Battery System 18 | |
| Cooling Need | IDCM, PIM, Elec. Motor, Condenser, Battery | | | | | Battery System 18 |
| Valve 46 Position | Flow through 2nd outlet 74 | Flow through 1st & 2nd outlets 72, 74 | Flow only through 1st outlet 72 | Flow only through 3rd outlet 76 | Flow only through 3rd outlet 76 | Flow only through 2nd outlet 74 |
| Valve 54 Position | Parallel Mode | Parallel Mode | Series Mode | Parallel Mode | Series Mode | Parallel Mode |
| Hi Temp Loop 20 | Closed Loop | Combined with Lo Temp Loop 20 | Combined with Lo Temp Loop 20 | Closed Loop | Closed Loop | Closed Loop |
| Lo Temp Loop 22 | Closed Loop | Combined with Hi Temp Loop 22 | Combined with Hi Temp Loop 22 | Bypass LT Radiator 56 | Bypass LT Radiator 56 | Closed Loop |
| Battery Loop 24 | Closed Loop | Closed Loop | Combined with Lo Temp Loop 20 | Closed Loop | Combined with Lo Temp Loop 20 | Closed Loop |
| Shutoff 126 | Closed | Closed | Closed | Closed | Closed | Open |
| Heater 106 | Off | Off | Off | On (if vehicle unplugged) | Optionally On | Off |
| Heater 36 | Off (unless requested) | Off | Off | On | Off | Off |

FIG. 2

ELECTRIC VEHICLE THERMAL SYSTEM WITH WASTE HEAT RECOVERY

FIELD

The present application relates generally to vehicle thermal systems and, more particularly, to vehicle thermal systems for recovering waste heat to optimize thermal system energy usage.

BACKGROUND

Some vehicles utilize heat from an internal combustion engine to heat the passenger cabin. However, the propulsion system of an electric vehicle generates relatively little heat. Typically, the small amount of heat generated by the drivetrain is ignored, and any heating required is provided by electric heaters. However, some electrical heaters consumer large amounts of energy during operation. Thus, while such conventional systems work well for their intended purpose, there is a desire to provide improvement in the relevant art.

SUMMARY

According to one example aspect of the invention, a thermal system for a vehicle is provided. In one exemplary implementation, the thermal system includes a high temperature coolant loop thermally coupled to a heater core, a low temperature coolant loop thermally coupled to at least one of an electric motor and power electronics, and a first four-way valve configured to selectively fluidly couple the high temperature coolant loop and the low temperature coolant loop such that coolant heated by the electric motor and/or the power electronics is directed to the heater core to facilitate heating of an airflow passing thereby.

In addition to the foregoing, the described thermal system may include one or more of the following features: wherein the first four-way valve is disposed on the low temperature coolant loop and includes a first outlet configured to direct coolant to the high temperature coolant loop, a second outlet configured to direct coolant to a radiator, and a third outlet configured to direct coolant to a radiator bypass line; and an air conditioning loop having a compressor, a condenser, an expansion device, and an evaporator, wherein the condenser is thermally coupled to the low temperature coolant loop upstream of the first four-way valve.

In addition to the foregoing, the described thermal system may include one or more of the following features: a battery system coolant loop thermally coupled to a high voltage battery system, and a second four-way valve coupled between and configured to selectively fluidly couple the low temperature coolant loop and the battery system coolant loop; an air conditioning loop having a compressor, a condenser, an expansion device, a chiller, and an evaporator, wherein the chiller is thermally coupled to the battery system coolant loop downstream of the second four-way valve to facilitate providing cooling to the battery system; wherein the expansion device includes a first expansion device disposed upstream of the chiller and a second expansion device disposed upstream of the evaporator; wherein the first expansion device is a thermal expansion valve with an integrated shut off valve; wherein the first expansion device and the chiller are disposed on a first branch of the air conditioning loop, and the second expansion valve and the evaporator are disposed on a second branch of the air conditioning loop; and wherein the power electronics include an integrated dual charging module (IDCM) and a power inverter module (PIM).

According to another example aspect of the invention, a thermal system for an electric vehicle is provided. In one implementation, the thermal system includes a high temperature coolant loop thermally coupled to a heater core configured to heat an airflow, a low temperature coolant loop thermally coupled to an electric motor and power electronics, and a battery system coolant loop thermally coupled to a high voltage battery system. An air conditioning loop includes a compressor, a condenser thermally coupled to the low temperature coolant loop, a chiller thermally coupled to the battery system coolant loop, a first expansion device upstream of the chiller, and a second expansion device upstream of an evaporator. A first four-way valve selectively fluidly couples the low temperature coolant loop and the high temperature coolant loop, and a second four-way valve selectively fluidly couples the battery system coolant loop and the low temperature coolant loop.

In addition to the foregoing, the described thermal system may include one or more of the following features: wherein the first four-way valve includes a first outlet to provide coolant flow to the high temperature coolant loop, a second outlet to provide coolant flow to a radiator, and a third outlet to provide coolant flow to a radiator bypass line, wherein the first four-way valve is configured to selectively provide coolant through the first outlet, the second outlet, the third outlet, or any combination thereof; and a branch line fluidly coupled between the high temperature coolant loop and the low temperature coolant loop to enable coolant flow from the high temperature coolant loop to the radiator bypass line when the first four-way valve provides flow through the first outlet.

In addition to the foregoing, the described thermal system may include one or more of the following features: wherein the second four-way valve is configured to switch between a series mode position and a parallel mode position, wherein in the series mode position, the low temperature coolant loop and the battery system coolant loop are fluidly connected in series, and wherein in the parallel mode position, the low temperature coolant loop and the battery system coolant loop are fluidly connected in parallel; wherein downstream of the second four-way valve, the low temperature coolant loop splits into a first branch and a second branch before converging upstream of the first four-way valve; and wherein the electric motor and the power electronics are thermally coupled to the first branch, and the condenser is thermally coupled to the second branch.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 2 is a chart illustrating various operational modes of the thermal system shown in FIG. 1, in accordance with the principles of the present disclosure.

DETAILED DESCRIPTION

Figure 1:
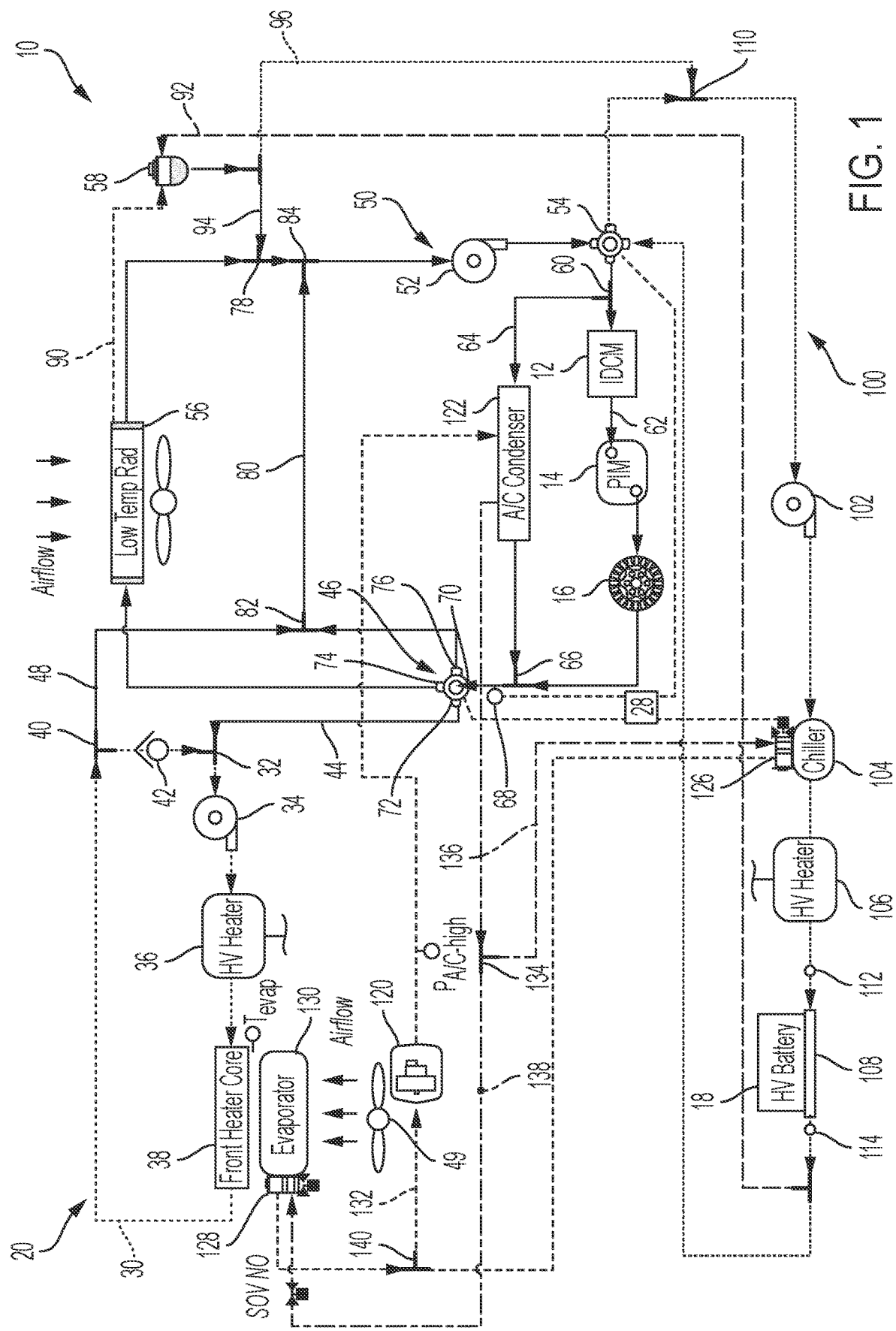
FIG. 1 is a schematic view of an example vehicle thermal system in accordance with the principles of the present disclosure.

The present application is directed to a thermal system for an electric vehicle. The system utilizes dual four-way valves to selectively reroute coolant to capture heat from the electric motor, power electronics, A/C condenser and/or the battery when available. Heat captured from the electric motor and power electronics may be utilized to heat the passenger cabin heater core and the battery. Additionally, if the battery is hot from a plug-in charge event, the captured heat may also be utilized to heat the passenger cabin heater core.

With initial reference to FIG. 1, an example vehicle thermal system is illustrated and generally identified at reference numeral 10. The thermal system 10 is configured to provide heating/cooling to various components of the vehicle such as power electronics including an integrated dual charging module (IDCM) 12 and a power inverter module (PIM) 14, an electric motor 16, and a high voltage (HV) battery system 18. The IDCM 12 includes a DC/DC converter that converts high voltage from the battery system 18 to power lower voltage electrical loads and charge a low voltage battery, and an on-board charging module that converts AC power from the wall to DC to charge the battery system 18 when the vehicle is plugged in.

In the example embodiment, the thermal system 10 generally includes a high temperature coolant loop 20, a low temperature coolant loop 22, a battery system coolant loop 24, and an air conditioning coolant loop 26. As shown, the NC loop 26 is fluidly isolated while the high temperature loop 20, the low temperature loop 22, and the battery system loop 24 are selectively fluidly coupled, as described herein in more detail.

The thermal system 10 includes a controller 28 such as an engine control unit (ECU), which is in signal communication with various components, valves, and sensors. As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

With continued reference to FIG. 1, in one example implementation, the high temperature loop 20 circulates a heat transfer fluid or coolant (e.g., water) and generally includes a main circuit 30 having a first junction 32, a pump 34, a high voltage heater 36, a heater core 38, a second junction 40, and a check valve 42. As described herein in more detail, the main circuit 30 is configured to selectively receive heated coolant at the first junction 32 via a branch conduit 44, which is fluidly coupled to a four-way proportional valve 46. In some operations, the coolant is directed to the low temperature loop 22 via a branch conduit 48 fluidly connected to the second junction 40.

The pump 34 is configured to circulate the coolant around the main circuit 30, and the heater 36 is configured to selectively heat the coolant passing through the main circuit 30 when additional heating is desired. The heater core 38, which is a passenger cabin heat exchanger operably associated with a blower 49, is configured to receive heated coolant to thereby provide heating to air supplied to the passenger cabin by blower 49.

In the example implementation, the low temperature loop 22 is fluidly coupled to the high temperature loop 20 and selectively circulates the coolant around a main circuit 50 to selectively provide cooling to the IDCM 12, PIM 14, and electric motor 16. In the illustrated example, the low temperature loop 22 generally includes a pump 52, a four-way toggle valve 54, the four-way proportional valve 46, a low temperature radiator 56, and an overflow bottle 58.

The pump 52 is configured to circulate the coolant around the main circuit 50 to the toggle valve 54, which is configured to switch between a parallel mode and a series mode. In the parallel mode, the toggle valve 54 is positioned such that the low temperature loop 22 and the battery system loop 24 are fluidly separate at the valve and operated in parallel. In this way, coolant entering the toggle valve 54 from pump 52 is directed to remain in the low temperature loop 22, while coolant entering the toggle valve 54 from the battery system loop 24 also remains therein. In contrast, in the series mode, the toggle valve 54 is positioned such that the low temperature loop 22 and the battery system loop 24 are fluidly connected at the valve and operated in series. In this way, coolant entering the toggle valve 54 from pump 52 is directed into the battery system loop 24, while coolant entering the toggle valve 54 from the battery system loop 24 is directed into the low temperature loop main circuit 50.

As shown in FIG. 1, in the low temperature loop 22, coolant from the toggle valve 54 is directed to a first junction 60 where the flow is split into a first branch 62 and a second branch 64. The IDCM 12, the PIM 14, and the electric motor 16 are thermally coupled to the first branch 62, while the second branch 64 is thermally coupled to the NC loop 26. The first and second branches 62, 64 converge at a second junction 66, which subsequently directs the coolant past a temperature sensor 68 before entering the four-way valve 46. The temperature sensor 68 is in signal communication with controller 28, which is configured to switch valve 46 based at least in part on one or more signals received from temperature sensor 68 indicative of the coolant temperature downstream of the electric motor and power electronics.

In the example embodiment, the valve 46 is a proportional four-way valve having an inlet 70, a first outlet 72, a second outlet 74, and a third outlet 76. Depending on the desired operation of thermal system 10, controller 28 is configured to control valve 46 to selectively direct coolant through the first outlet 72, the second outlet 74, the third outlet 76, or any combination thereof.

As shown in FIG. 1, the valve inlet 70 is configured to receive coolant from the second junction 66, and the first outlet 72 is fluidly coupled to branch conduit 44. The second outlet 74 is fluidly connected to the low temperature loop main circuit 50 and is configured to supply coolant to the low temperature radiator 56 and subsequently to a third junction 78. The third outlet 76 is configured to supply coolant to a radiator bypass line 80 via a fourth junction 82 and a fifth junction 84. The fourth junction 82 is configured to receive coolant from the high temperature loop 20 via the branch conduit 48, and the fifth junction 84 is disposed on the low temperature loop main circuit 50 downstream of the third junction 78.

In the illustrated example, the overflow bottle 58 is configured to receive coolant overflow from the low temperature radiator 56 via a radiator overflow line 90, as well as coolant overflow from the battery system loop 24 via a battery overflow line 92. The overflow bottle 58 subsequently directs the received coolant back to the low temperature loop 22 via a low temp loop return line 94, which is fluidly coupled to the third junction 78. Similarly, the coolant is directed back to the battery system loop 24 via a battery loop return line 96.

With continued reference to FIG. 1, the battery system loop 24 will be described in more detail. In the example embodiment, the battery system loop 24 generally includes a main circuit 100, a pump 102, a chiller 104, a HV heater 106, and a heat exchanger 108. Coolant is received from the four-way toggle valve 54 and is supplied to a first junction 110, which also receives coolant from the overflow bottle 58 via the battery loop return line 96. The pump 102 receives coolant from the first junction 110 and is configured to circulate the coolant around the main circuit 100.

The chiller 104 is thermally coupled to the A/C loop 26 and is configured to selectively utilize the NC refrigerant to indirectly cool the coolant of the battery system loop 24 passing therethrough. Such thermal transfer is configured to subsequently cool the battery system 18 via the heat exchanger 108, for example, during high ambient temperatures. In a similar but opposite manner, the heater 106 is configured to selectively heat the coolant passing through the main circuit 100 to subsequently heat the battery system 18 via heat exchanger 108 when desired (e.g., during a cold start). Additionally, a first temperature sensor 112 and a second temperature sensor 114 are in signal communication with controller 28 and respectively disposed on the main circuit 100 upstream and downstream of the heat exchanger 108. In this way, controller 28 can control valves 46, 54 based at least in part on one or more signals from the temperature sensors 112, 114 indicative of the coolant temperature in the main circuit 100.

With continued reference to FIG. 1, in the example implementation, NC loop 24 is a standard vehicle air conditioning system that generally includes a compressor 120, a condenser 122, the chiller 104, a first expansion device 126, a second expansion device 128, and an evaporator 130.

In operation, a suction line 132 provides gaseous refrigerant to compressor 120, which subsequently compresses the refrigerant. The compressed and heated refrigerant is then directed to the condenser 122 where the heat from compression is dissipated and the refrigerant condenses to a liquid. The liquid refrigerant is then directed to a first junction 134, which divides the coolant flow into a first branch 136 and a second branch 138.

The first branch 136 is configured to supply refrigerant to the first expansion device 126, which is a thermal expansion valve with an integrated shutoff valve. When the shutoff valve is in a closed position, refrigerant is prevented from flowing through first branch 136. When the shutoff valve is in an open position, refrigerant is able to flow through the first branch 136 to the first expansion device 126 where it is reduced in pressure and vaporized, thereby reducing the temperature of the refrigerant. The cooled vapor refrigerant is then supplied to chiller 104, where it is evaporated to provide cooling to the coolant circulating within the battery system loop 24. The resulting gaseous, warmed refrigerant is then returned to the compressor 120 via a second junction 140 to the suction line 132 where the cycle is then repeated.

The second branch 138 is configured to supply refrigerant to the second expansion device 128 (e.g., expansion valve), where it is reduced in pressure and vaporized, thereby reducing the temperature of the refrigerant. The cooled vapor refrigerant is then supplied to evaporator 130, where it is evaporated to providing cooling to the cabin air from blower 49. The resulting gaseous, warmed refrigerant is then returned to the compressor 120 via suction line 132 and the cycle is repeated.

With reference now to FIG. 2, various operational modes of the thermal system 10 will be described. It will be appreciated, however, that system 10 is not limited to the described operational modes, which are merely exemplary. As described herein, controller 28 is configured to operate thermal system 10 based on one or more signals from various system components (e.g., valves, sensors, etc.). In particular, controller 28 is programmed to move the four-way valves 46, 54 between various positions based on predetermined desired temperatures of IDCM 12, PIM 14, electric motor 16, battery system 18, heater core 38, and/or other components of system 10.

In an example first mode where normal operation is requested, controller 28 moves the four-way valve 46 to a position to direct flow through the second outlet 74, while moving the four-way valve 54 to the parallel mode position. In this operation, each of the high temperature loop 20, the low temperature loop 22, and the battery system loop 24 operate in a closed loop. Without need for additional heating or cooling, heater 106 is turned off and valve 126 is moved to a closed position to prevent flow through chiller 104. While typically off, heater 36 may be turned on if increased heat is requested in the passenger cabin.

In an example second mode where low heating demand is requested in the passenger cabin, controller 28 moves the four-way valve 46 to provide flow through the first and second outlets 72, 74, while moving the four-way valve 54 to the parallel mode position. In this operation, the high temperature loop 20 receives a portion of coolant heated by IDCM 12, PIM 14, electric motor 16, and/or condenser 122 to thereby provide a relatively small amount of additional heat (compared to the full coolant flow). However, the remaining portion of the heated coolant is directed through the second outlet 74 for typical cooling in radiator 56 since only low additional heating is requested for heater core 38. Battery system loop 24 is operated in a closed loop, and with no additional heating/cooling requested for battery system 18, heater 106 is off and valve 126 is closed. Advantageously, heater 36 is turned off to conserve energy since waste heat in the low temperature loop 22 is utilized to warm the heater core 38.

In an example third mode where high heating demand is requested in the passenger cabin, controller 28 moves the four-way valve 46 to provide flow only through the first outlet 72, while moving the four-way valve 54 to the series mode position. In this operation, the high temperature loop 20 receives coolant heated by IDCM 12, PIM 14, electric motor 16, and/or condenser 122. Additionally, because the low temperature loop 22 and the battery system loop 24 are operated in series, coolant heated by the battery system 18 is also directed to the high temperature loop 20 via first outlet 72. With no additional heating/cooling requested for battery system 18, heater 106 is off and valve 126 is closed. Advantageously, heater 36 is turned off to conserve energy since waste heat in the low temperature loop 22 and the battery system loop 24 are utilized to warm the heater core 38.

In an example fourth mode where the vehicle performs a cold start, controller 28 moves the four-way valve 46 to provide flow only through the third outlet 76, while moving the four-way valve 54 to the parallel mode position. In this operation, each of the high temperature loop 20, the low temperature loop 22, and the battery system loop 24 operate in a closed loop. Because the vehicle and thermal system 10 are cold, valve 126 is closed and heater 36 is turned on to rapidly heat the heater core 38. The high temperature loop 20 is closed thus maintaining the heated coolant within the main circuit 30. The low temperature loop 22 directs the coolant via radiator bypass line 80 to facilitate rapid warming of the IDCM 12, PIM 14, and electric motor 16. Additionally, the battery heater 106 is turned on to rapidly warm the battery system 18 unless sensors 112, 114 indicate battery system 18 is sufficiently heated, for example, due to plug in charge event.

In an example fifth mode where battery heating is requested, controller 28 moves the four-way valve 46 to provide flow only through the third outlet 76, while moving four-way valve 54 to the series mode position. In this operation, the high temperature loop 20 operates in a closed loop with the heater 36 turned off, and the low temperature loop 22 and the battery system loop 24 are fluidly connected in series. Coolant heated by the IDCM 12, PIM 14, electric motor 16, and/or condenser 122 is directed via the radiator bypass line 80 into the battery system loop main circuit 100 to facilitate rapid warming of the battery system 18. Without cooling needed, valve 126 is maintained in the closed position. Advantageously, heater 106 is turned off to conserve energy since waste heat in the low temperature loop 22 is utilized to heat the battery system 18. However, if additional heating is required, the heater 106 is optionally turned on to facilitate faster warming.

In an example sixth mode where battery cooling is requested, controller 28 moves the four-way valve 46 to provide flow through the second outlet 74, while moving the four-way valve 54 to the parallel mode position. In this operation, each of the high temperature loop 20, the low temperature loop 22, and the battery system loop 24 operate in a closed loop. With no additional heating requested, heaters 36, 106 are turned off. However, valve 126 is opened to provide refrigerant flow through A/C branch 136, thereby providing additional cooling to the coolant in the battery system main circuit 100 via chiller 104 to facilitate rapid cooling of the battery system 18. As noted above, other modes of operation of thermal system 10 are envisioned.

Described herein are systems and methods for utilizing waste heat in an electric vehicle to warm components without having to operate supplemental electric heaters, which consume large amounts of power. The system utilizes dual four-way valves to selectively fluidly connect three distinct coolant loops based on which components require heating or cooling. In this way, the system can transfer heat between the passenger cabin, electronics, and battery in any direction without heating via an electric heater, thereby conserving system power.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A thermal system for an electric vehicle having an electric motor and electric vehicle power electronics, comprising:
a high temperature coolant loop thermally coupled to a heater core;
a low temperature coolant loop thermally coupled to at least one of the electric motor and electric vehicle power electronics; and
a first four-way valve configured to selectively fluidly couple the high temperature coolant loop and the low temperature coolant loop such that coolant heated by the electric motor and/or the electric vehicle power electronics is directed to the heater core to facilitate heating of an airflow passing thereby,
wherein the first four-way valve is disposed on the low temperature coolant loop and includes:
a first outlet configured to direct coolant to the high temperature coolant loop;
a second outlet configured to direct coolant to a radiator; and
a third outlet configured to direct coolant to a radiator bypass line.

2. The thermal system of claim 1, further comprising an air conditioning loop having a compressor, a condenser, an expansion device, and an evaporator,
wherein the condenser is thermally coupled to the low temperature coolant loop upstream of the first four-way valve.

3. A thermal system for a vehicle, comprising:
a high temperature coolant loop thermally coupled to a heater core;
a low temperature coolant loop thermally coupled to at least one of an electric motor and power electronics;
a first four-way valve configured to selectively fluidly couple the high temperature coolant loop and the low temperature coolant loop such that coolant heated by the electric motor and/or the power electronics is directed to the heater core to facilitate heating of an airflow passing thereby;
a battery system coolant loop thermally coupled to a high voltage battery system; and
a second four-way valve coupled between and configured to selectively fluidly couple the low temperature coolant loop and the battery system coolant loop.

4. The thermal system of claim 3, further comprising an air conditioning loop having a compressor, a condenser, an expansion device, a chiller, and an evaporator,
wherein the chiller is thermally coupled to the battery system coolant loop downstream of the second four-way valve to facilitate providing cooling to the battery system.

5. The thermal system of claim 4, wherein the expansion device includes a first expansion device disposed upstream of the chiller and a second expansion device disposed upstream of the evaporator.

6. The thermal system of claim 5, wherein the first expansion device is a thermal expansion valve with an integrated shut off valve.

7. The thermal system of claim 6, wherein the first expansion device and the chiller are disposed on a first branch of the air conditioning loop, and the second expansion valve and the evaporator are disposed on a second branch of the air conditioning loop.

8. The thermal system of claim 1, wherein the power electronics include an integrated dual charging module (IDCM) and a power inverter module (PIM).

9. A thermal system for an electric vehicle, comprising:
a high temperature coolant loop thermally coupled to a heater core configured to heat an airflow;
a low temperature coolant loop thermally coupled to an electric motor and power electronics;

a battery system coolant loop thermally coupled to a high voltage battery system;

an air conditioning loop having a compressor, a condenser thermally coupled to the low temperature coolant loop, a chiller thermally coupled to the battery system coolant loop, a first expansion device upstream of the chiller, and a second expansion device upstream of an evaporator;

a first four-way valve selectively fluidly coupling the low temperature coolant loop and the high temperature coolant loop; and a second four-way valve selectively fluidly coupling the battery system coolant loop and the low temperature coolant loop.

10. The thermal system of claim 9, wherein the first four-way valve includes:

a first outlet to provide coolant flow to the high temperature coolant loop;

a second outlet to provide coolant flow to a radiator; and a third outlet to provide coolant flow to a radiator bypass line, wherein the first four-way valve is configured to selectively provide coolant through the first outlet, the second outlet, the third outlet, or any combination thereof.

11. The thermal system of claim 10, further comprising a branch line fluidly coupled between the high temperature coolant loop and the low temperature coolant loop to enable coolant flow from the high temperature coolant loop to the radiator bypass line when the first four-way valve provides flow through the first outlet.

12. The thermal system of claim 9, wherein the second four-way valve is configured to switch between a series mode position and a parallel mode position, wherein in the series mode position, the low temperature coolant loop and the battery system coolant loop are fluidly connected in series, and wherein in the parallel mode position, the low temperature coolant loop and the battery system coolant loop are fluidly connected in parallel.

13. The thermal system of claim 9, wherein downstream of the second four-way valve, the low temperature coolant loop splits into a first branch and a second branch before converging upstream of the first four-way valve.

14. The thermal system of claim 13, wherein the electric motor and the power electronics are thermally coupled to the first branch, and the condenser is thermally coupled to the second branch, and wherein the electric vehicle is free from a combustion engine.

\* \* \* \* \*